Aug. 2, 1932.   C. E. SCHLENKER   1,869,440
INTERNAL COMBUSTION ENGINE
Filed June 3, 1929   8 Sheets-Sheet 2

INVENTOR:
CHARLES E. SCHLENKER
BY
ATTORNEYS

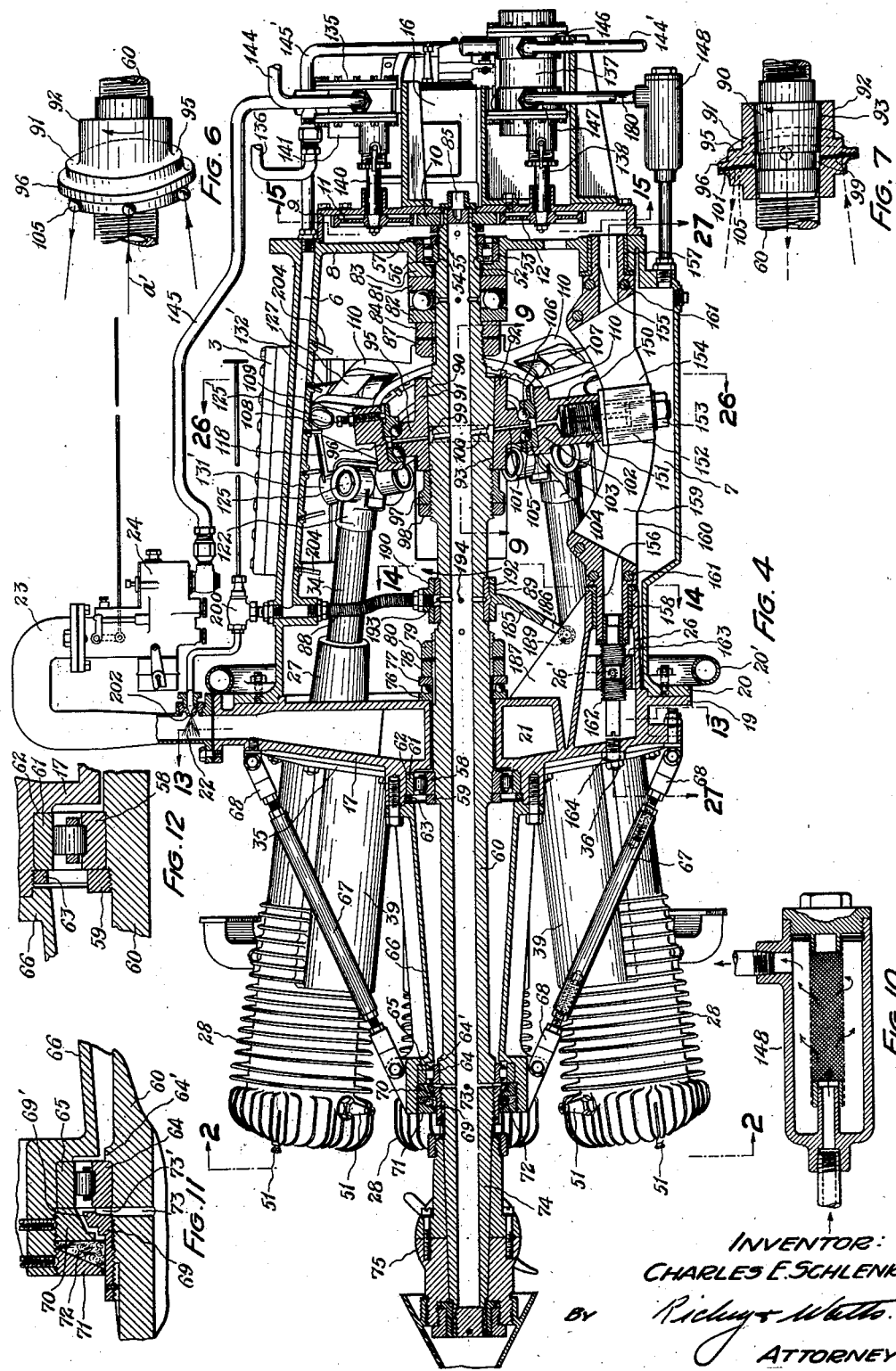

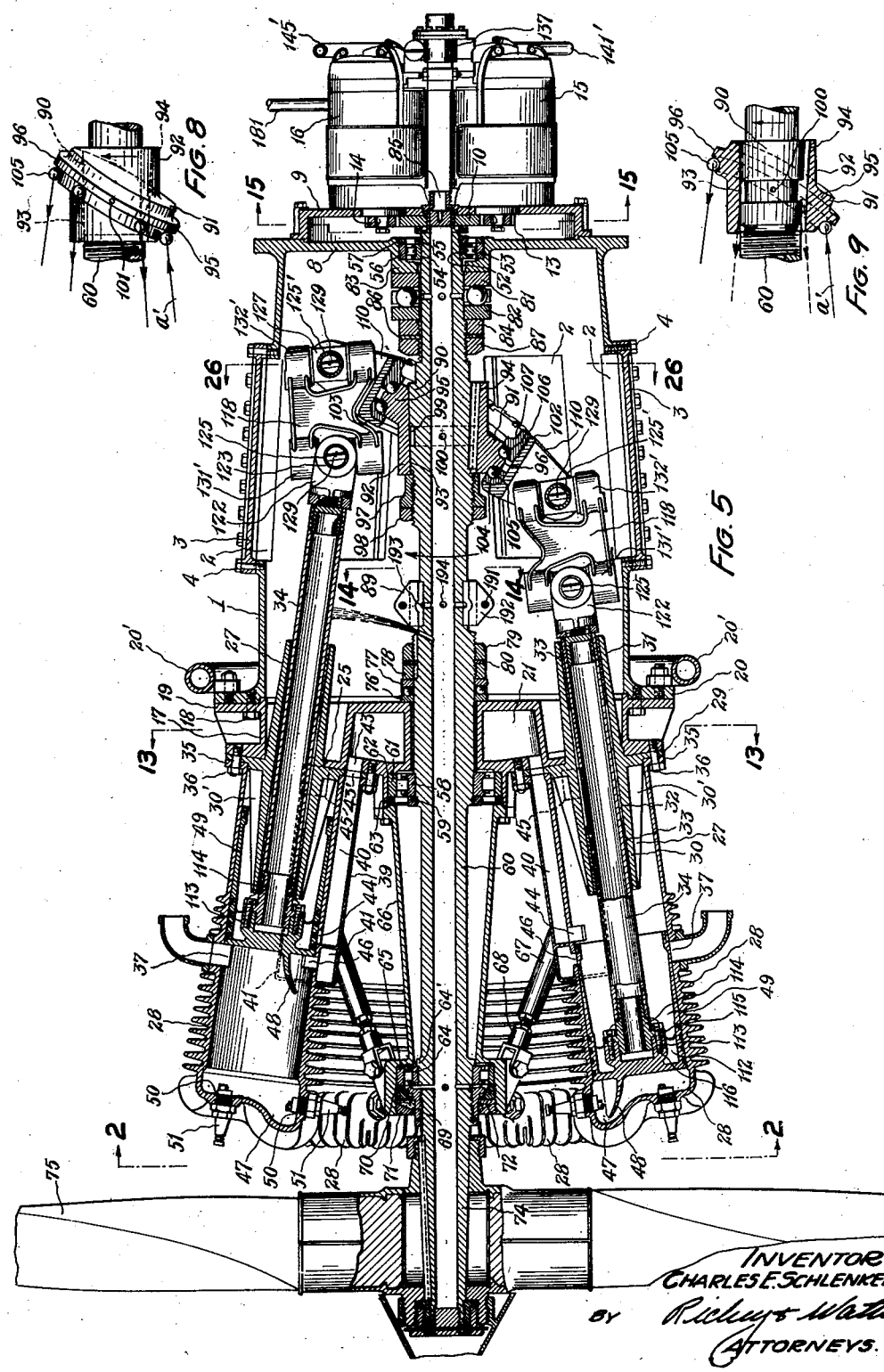

Aug. 2, 1932.　　　C. E. SCHLENKER　　　1,869,440
INTERNAL COMBUSTION ENGINE
Filed June 3, 1929　　　8 Sheets-Sheet 5

INVENTOR:
CHARLES E. SCHLENKER
BY Richey & Watts
ATTORNEYS

Aug. 2, 1932.  C. E. SCHLENKER  1,869,440
INTERNAL COMBUSTION ENGINE
Filed June 3, 1929  8 Sheets-Sheet 6

INVENTOR:
CHARLES E. SCHLENKER
BY Richey & Watts
ATTORNEYS

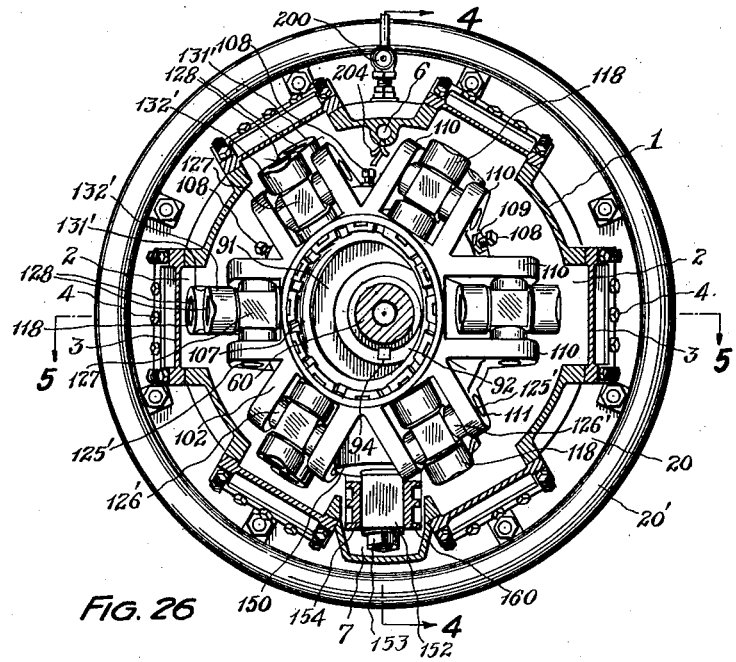
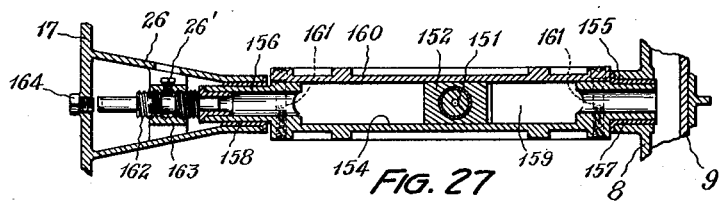
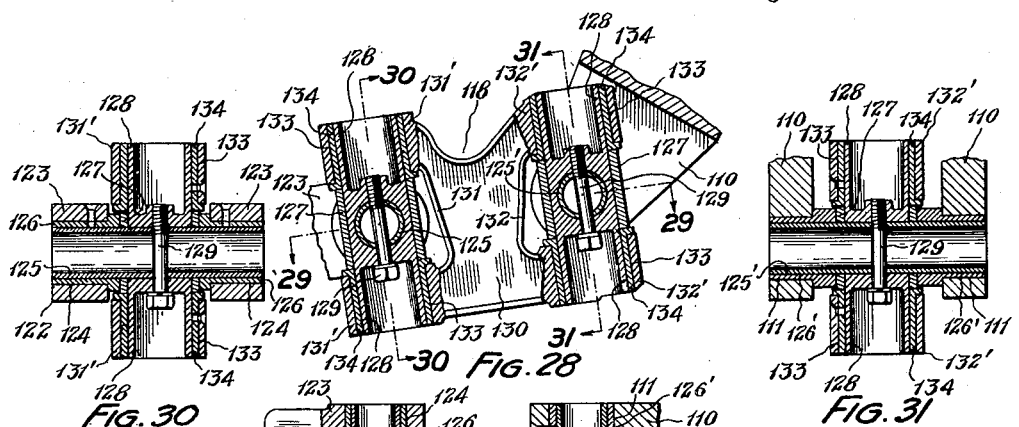
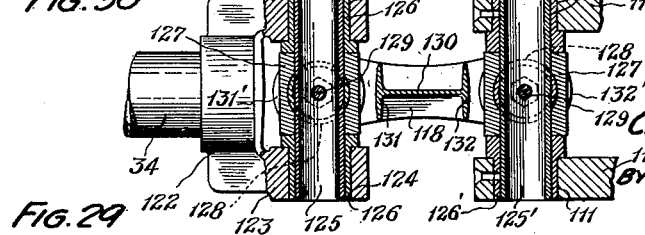

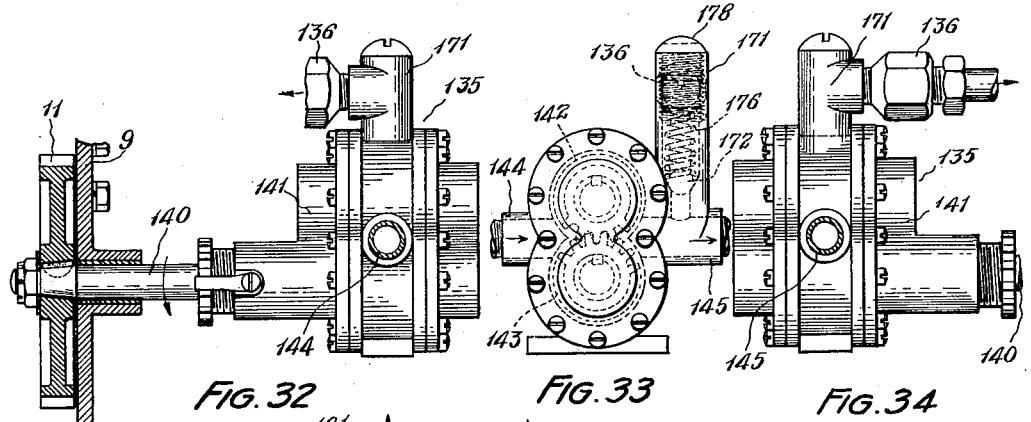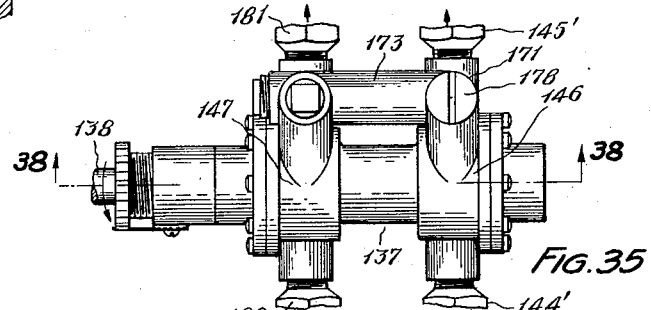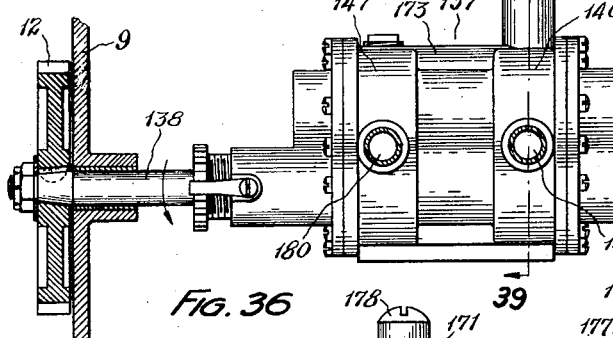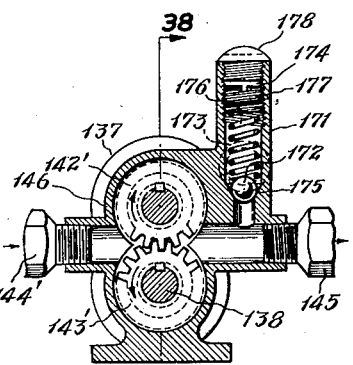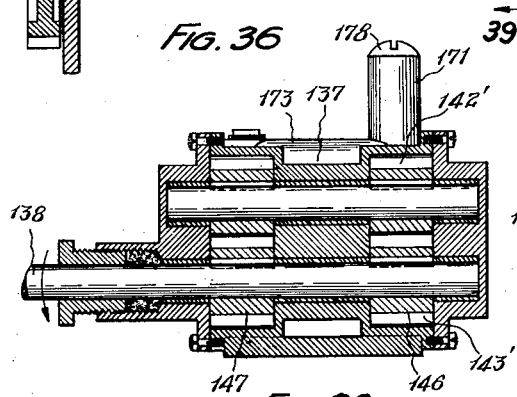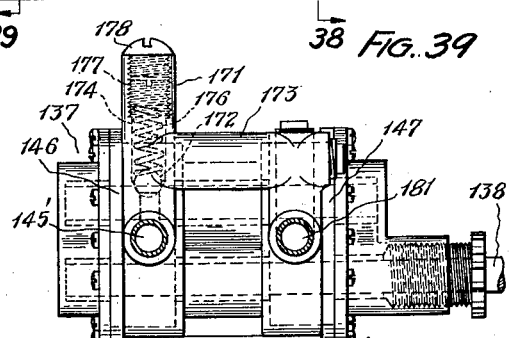

Patented Aug. 2, 1932

1,869,440

UNITED STATES PATENT OFFICE

CHARLES E. SCHLENKER, OF LAKEWOOD, OHIO, ASSIGNOR TO WESTERN RESERVE AIR MOTORS CORPORATION, A CORPORATION OF OHIO

INTERNAL COMBUSTION ENGINE

Application filed June 3, 1929. Serial No. 367,857.

This invention relates to engines and more particularly to an improved internal combustion engine and a method of operating the same.

An object of this invention is to provide an internal combustion engine wherein the crank arms and crank shaft of the usual type may be eliminated.

Another object of this invention is to provide an engine in which no side play or lateral thrust is imparted to the piston.

Another object of this invention is to provide an internal combustion engine having an improved means of supplying the combustible gases to the cylinders.

Another object of this invention is to provide an internal combustion engine having an improved oiling system.

Another object of this invention is to provide an engine adaptable for use upon airplanes wherein the parasite resistance is small.

Another object of this invention is to provide an internal combustion engine wherein the valve ports may be varied by adjustment of the driven shaft.

Another object of this invention is to provide an engine in which the maximum and minimum volume of the compression chamber may be varied.

Another object of this invention is to provide an internal combustion engine wherein breakage of a piston rod would not render the entire motor inoperative.

Another object of this invention is to provide an improved guiding connection between the elements adapted to eliminate lateral thrust.

Another object of this invention is to provide a placement of the cylinders which is adapted to increase the cooling thereof.

Other objects of the invention and the invention itself will become more apparent from the following description wherein reference is had to the accompanying drawings forming a part of this specification.

In the drawings:

Figs. 4 and 5 are vertical medial sectional and horizontal medial sectional views respectively of the engine;

Fig. 6 is a fragmentary elevational view of a driven member and shaft used in the engine as viewed in Fig. 4, certain ball bearings being shown in their operative positions to better indicate the lines of thrust.

Fig. 7 is a view of the same elements the driven member being shown in section and certain hidden parts being shown by dotted lines.

Fig. 8 is a plan view of the elements of Fig. 6;

Fig. 9 is a sectional view of the same elements taken on a horizontal medial plane indicated by line 9—9 of Fig. 4;

Fig. 10 is a fragmentary sectional view through an oil sediment strainer;

Fig. 11 is an enlarged fragmentary sectional view of the front main bearing for the driven shaft;

Fig. 12 is a like view of an intermediate main bearing;

Fig. 26 is a section taken on the line 26—26 of Fig. 4;

Fig. 27 is a section taken on the line 27—27 of Fig. 4;

Fig. 28 is a fragmentary view of a universal coupling link used to connect the piston rods to the driving member, certain parts being shown in section;

Fig. 29 is a sectional view taken on the line 29—29 of Fig. 28;

Figure 1:
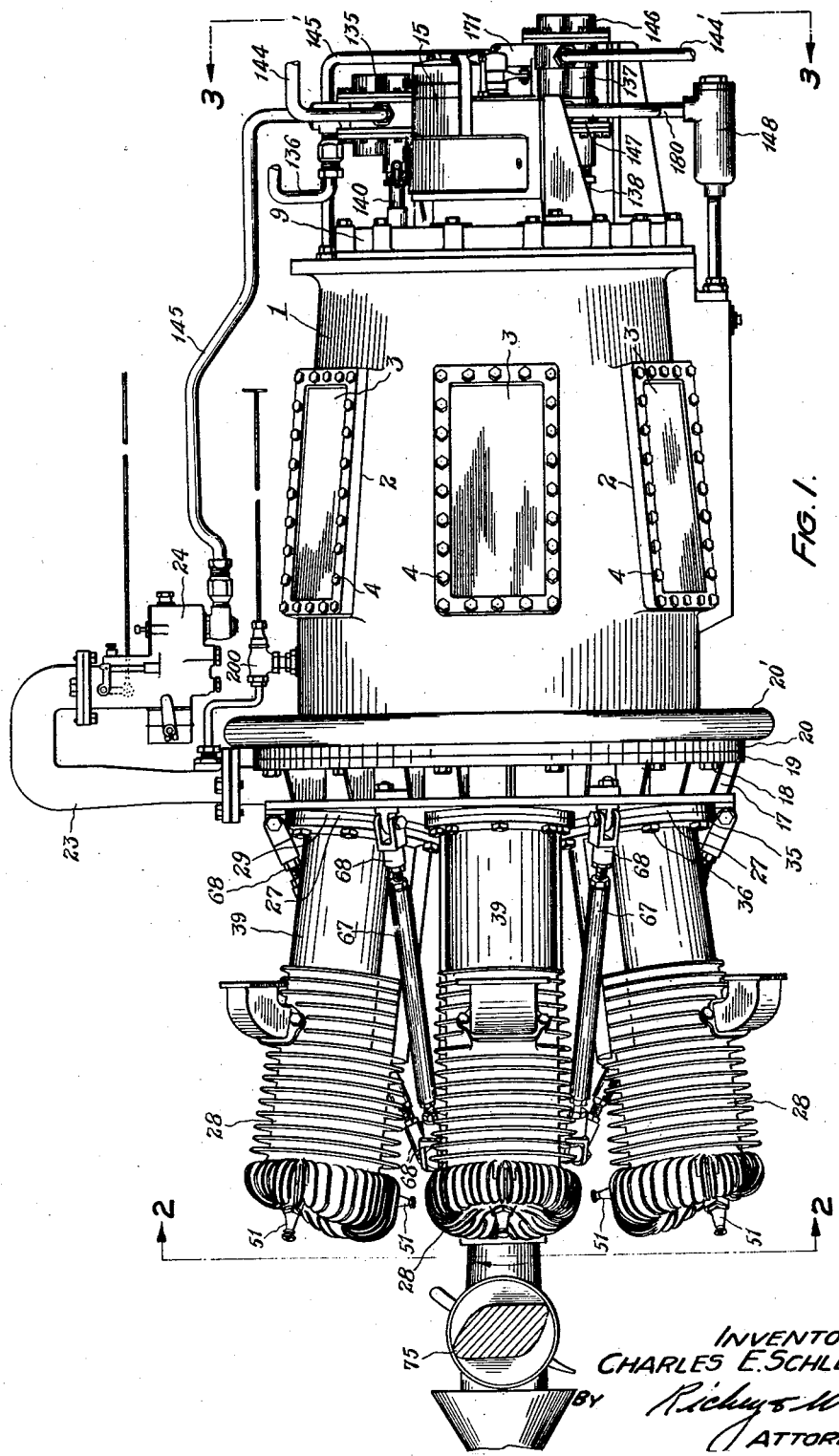
Fig. 1 is a side elevational view of the engine of this invention showing a fragment of a propeller adapted to be driven thereby.
Figure 2:
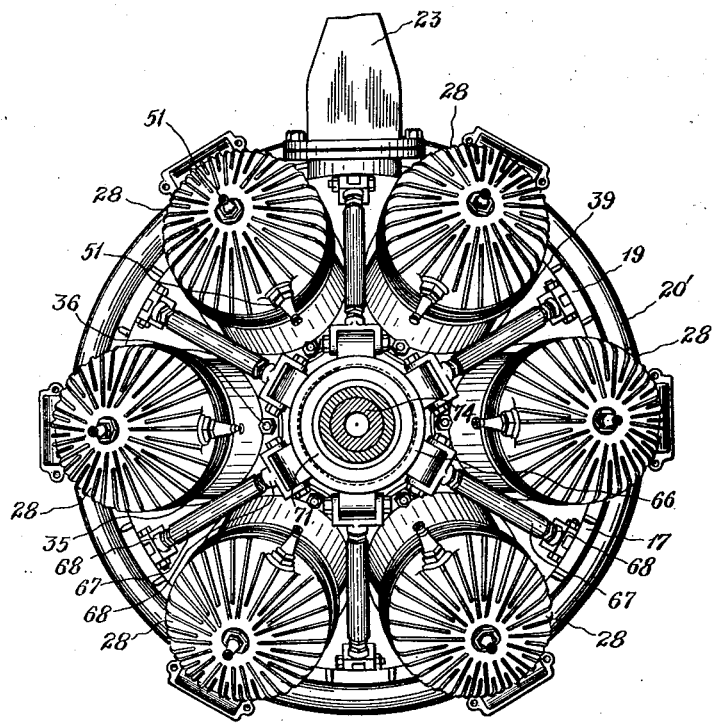
Fig. 2 is a front elevational view taken from the plane indicated by the line 2—2 of Fig. 1, the propeller shaft being shown in section.
Figure 3:
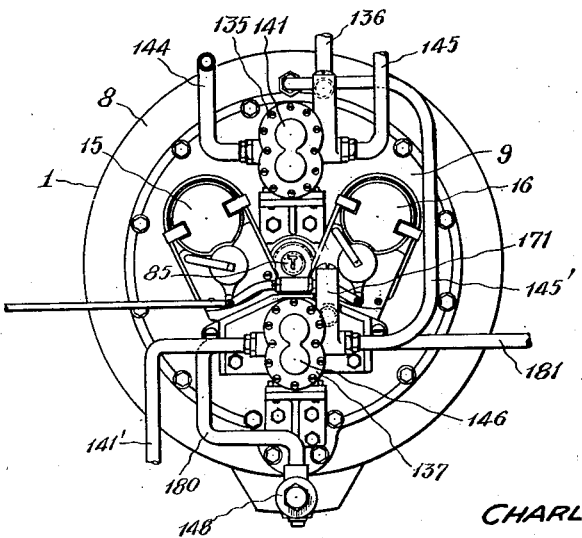
Fig. 3 is a rear elevation of the engine certain conduits being broken away.
Figure 13:
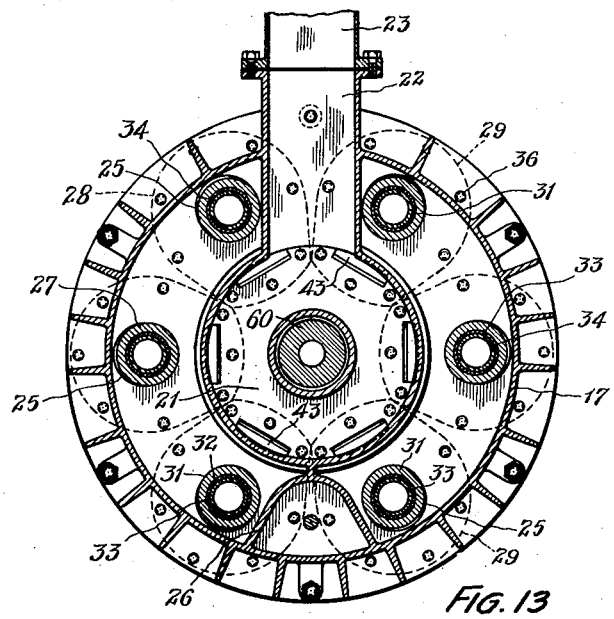
Fig. 13 is a vertical section taken from the line 13—13 of Fig. 4.

Figs. 30 and 31 are sectional views taken on the lines 30—30 and 31—31 respectively of Fig. 28;

Fig. 32 is an enlarged elevational view of a gasoline pump used on the engine;

Fig. 33 is an end view thereof;

Fig. 34 is a view similar to Fig. 32 taken from the opposite side;

Fig. 35 is a plan view of an oil pump used on the engine;

Fig. 36 is an elevational view thereof;

Fig. 37 is a view from the opposite side, certain internal parts being indicated by dotted lines;

Fig. 38 is a vertical medial section thereof taken on line 38—38 of Fig. 35; and Fig. 39 is a vertical section taken on the line 39—39 of Fig. 36.

Referring particularly to the drawings throughout which parts are designated by like reference characters:

The engine of my invention comprises generally a substantially cylindrical housing which supports a driven shaft, the shaft being rotatably journaled in said housing and extending axially therethrough. A detachable end wall is provided for the housing and has an intake passage manifold integral therewith. The end wall is also adapted to support a plurality of cylinders with their axes disposed in a substantially frustro-conical plane. The driven shaft is provided with a driven member or cam, sometimes called a swash or wobble plate, which is operatively connected to piston rods by suitable universal joint members. The piston rods are rigidly secured to pistons and reciprocate therewith in the cylinders.

Piston rod guides are provided, interposed between the cylinders and the intake manifold member. The driven shaft extends beyond both ends of the housing and may support a propeller or the like on one end, the other end being provided with one of a train of gears adapted to drive the accessories, such as magnetos, oil pumps, gasoline pump and the like.

More particularly the component parts which form the engine of my invention are as follows:

Main housing

The main housing or crank case 1 is of a substantially cylindrical form, as best illustrated in Figure 1, and is provided with a plurality of radially disposed openings 2 closed by plates 3 which are held in place by suitable screws 4, which permits access to the interior of the housing at various points from the exterior thereof.

A suitable oil passageway 6, Figs. 4 and 26, is provided integral with the housing, and a sump 7 is located at the lowermost portion of the housing into which the oil may drain and which also provides sufficient clearance in the housing for a torque arm, hereinafter more fully described, to reciprocate.

Figure 15:
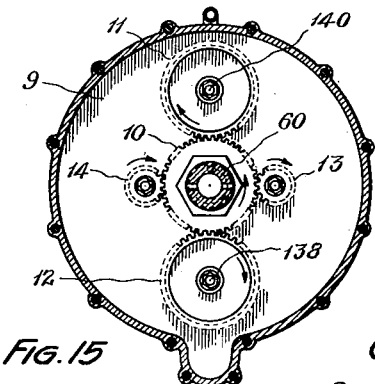
Fig. 15 is a sectional view taken from line 15—15 of Fig. 4.
Figure 20:
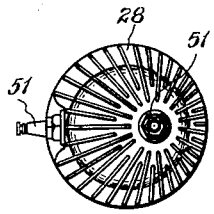
Fig. 20 is an end elevational view of the cylinder head.
Figure 16:
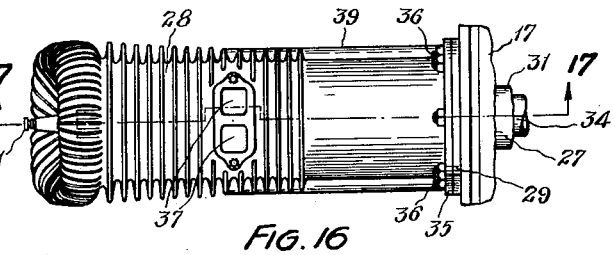
Fig. 16 is a view of an engine cylinder taken from the plane indicated by the line 16—16 of Fig. 17.
Figure 21:
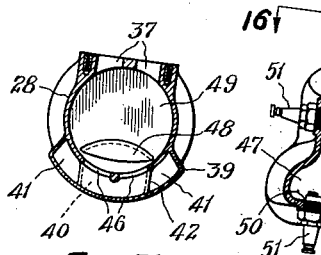
Fig. 21 is a section taken on the line 21—21 of Fig. 17.
Figure 17:
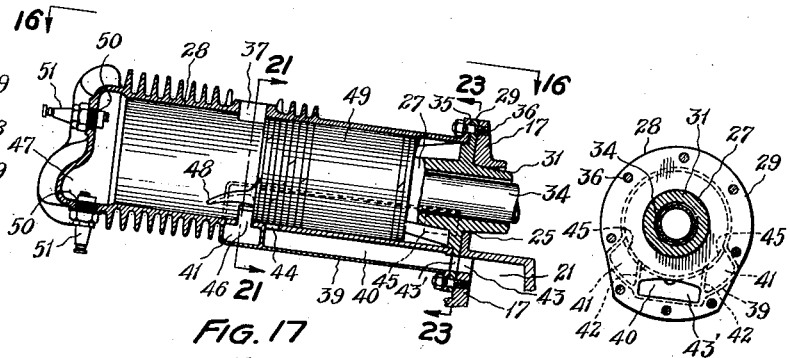
Fig. 17 is an axial section thereof taken on the line 17—17 of Fig. 16, a piston and a portion of the piston rod being shown in elevation, and as at the outer end of a stroke.
Figure 23:
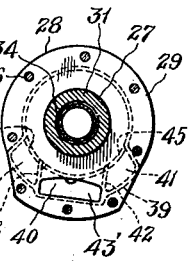
Fig. 23 is a section taken on the line 23—23 of Fig. 17.
Figure 22:
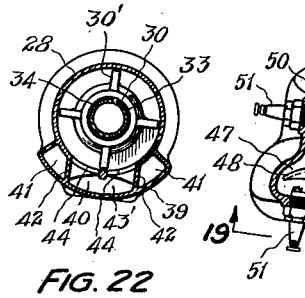
Fig. 22 is a section taken on the line 22—22 of Fig. 18.

One end of the housing is closed by a wall 8 and a gear housing 9 is secured thereto. The gear housing supports a plurality of gears as best shown in Figure 15. A central drive gear 10 is supported by the driven shaft and meshes with a plurality of gears; two relatively large gears 11 and 12 adapted to drive a gasoline pump and oil pump respectively, and two relatively small gears 13 and 14 drive a pair of magnetos 15 and 16, as clearly shown in Figs. 1, 3, 4, 5 and 26.

Intake manifold

The other end of the housing 1 is closed by a manifold member 17 of generally circular form, secured thereto by a plurality of cap screws 18 which are disposed through apertures in a peripheral flange 19 of the manifold into an outwardly extending peripheral flange 20 of the housing. The flange 20 may be secured to a circular tubular engine support 20′, forming a part of the fuselage of an airplane. A central toroidal passage 21 of substantially rectangular section is provided in the member 17, and is connected by a canal 22 to a carburetor manifold 23 of inverted J-shape which supports a carburetor 24. A plurality of circular apertures 25 are provided through the wall of the member, through which piston rod guides, later more fully described, are adapted to extend. An extending portion 26 at the lower end of the manifold member projects into the main housing and supports adjustably a reciprocable guideway, later more fully described.

Cylinders and piston rod guides

Figure 25:
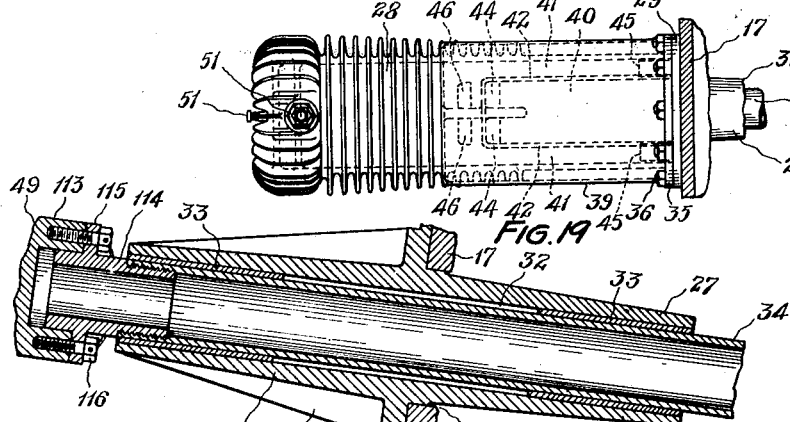
Fig. 25 is a fragmentary enlarged vertical section through a piston rod and guide.

The side of the manifold member is machined circumambient the apertures 25 to support thereon the piston rod guides 27 and cylinders 28, each piston rod guide, Fig. 25, comprises a flanged portion 29 which is machined to fit the surface of the manifold 17 previously described, and is provided with a pair of oppositely extending axially aligned bosses 30 and 31 adapted to extend into the cylinder and housing respectively. The guide has a central bore 32 which is lined with suitable bushings 33 adjacent each end. Strengthening webs 30' for the boss 30 extend from the flange 29 which is bolted between the cylinder and the manifold. The guides each support a piston rod 34, later more fully described.

Each cylinder is provided with a base flange 35 which is machined to fit the flange 29 on the guide. Both guides and cylinders have a plurality of apertures through the flanges through which studs 36 may be disposed and screwed into the intake manifold member securely holding the guide and cylinder thereto. The cylinder is provided with suitable fins to assist in the cooling thereof. A pair of exhaust ports 37 are disposed at its intermediate portion to which an exhaust manifold may be bolted. Fluid passages are provided by a jacket 39 disposed along one side of the cylinder from the end to an intermediate portion thereof and comprises a central passage 40 and two outer passages 41 separated from the center passage by walls 42. The intake manifold connects with the passage 40 through apertures 43 and 43' in the intake manifold member and cylinder respectively, which is adapted to conduct the fluid to a port 44 opening into the cylinder at the intermediate portion. Outlet passages 45 are provided at the end or base of the cylinder, which connect with the other gas passages 41 disposed on either side of the passage 40. The passages 41 connect to inlet ports 46 disposed longitudinally beyond the port 44.

Figure 18:
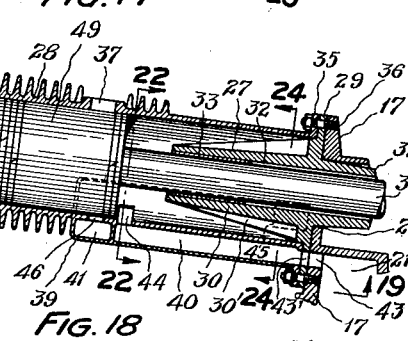
Fig. 18 is a similar view showing the piston at the other or inner end of the stroke.
Figure 24:
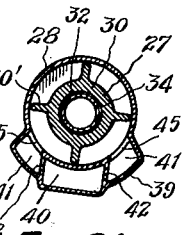
Fig. 24 is a section taken on the line 24—24 of Fig. 18.
Figure 19:
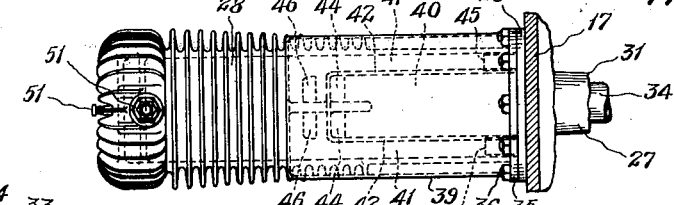
Fig. 19 is a view, taken from the line 19—19 of Fig. 18.

A short description of the purpose of these passages will better show the construction and is as follows:

The gas entering the intake manifold 21 during longitudinal movement of the piston to the left, as viewed in the figures, the end of the cylinder being closed by the guide 27 causes a so called partial vacuum to be set up in that area in the rear of the piston so that when the piston has moved far enough to uncover the ports 44 the gas is drawn from the intake manifold 21 through apertures 43 and 43' into the central canal 40 through the ports 44 into the chamber in the rear of the piston or the right, as viewed in Figure 18.

The cycle of the engine continuing, the skirt of the piston first shuts off the ports 44, then compresses the gas, due to its movement to the right and the consequent diminishing in volume of the chamber in the rear of the piston, forcing the compressed gas out through the ports 45 in the right end or base of the cylinder, through the passages 41 disposed on either side of the passage 40 to the ports 46 which are uncovered by the head of the piston, allowing the compressed gases to flow into the compression chamber above the piston head.

The head of the cylinder is provided with a suitable recess 47 into which a deflector plate 48 of the piston 49 may reciprocate. A pair of threaded apertures 50 are provided which open into the cylinder through the head adapted to receive therein spark plugs 51. The deflector plate is adapted to divert the incoming gases in such a manner that the chamber is swept clear of the exhaust gases before the compression stroke starts.

*Drive shaft and bearings*

A hollow shaft 60 is provided, and in the embodiment illustrated is supported within the housing by front, center and rear main bearings. The rear main bearing, comprises inner and outer races 52 and 53 the inner race is journaled upon a reduced annular portion 54 of the shaft and is secured thereon by a locking nut 55. The outer race is supported in a recess 56 formed in the housing end wall 8, being locked in the recess by a locking nut 57. The intermediate main bearing support, Figs. 4 and 12, comprises a bearing having an inner race 58 journaled upon the shaft and secured thereon by a lock nut 59; an outer race 61 is disposed in an annular recess 62 in the intake manifold member and is locked therein by a lock nut 63.

The front main bearing, Figs. 4 and 11, also comprises an inner race 64 journaled on an annular portion of the shaft abutting a flange 64'. The outer race 65 is supported in a recess in an extended housing 66 which is bolted to the intake manifold, rigidity thereof being obtained by adjustable rods 67 which are provided with clevices 68 on the ends which connect to the end of the extension and to the intake manifold adjacent the periphery thereof. The inner race is secured by a locking nut 69 and the outer race by a lock nut 70. A packing nut 71 is provided and is screw-threaded in the outer edge of the bearing recess. A packing 72 fills the recess provided by the packing nut and the lock nut 69 the packing being adapted to ride on the surface of the nut 69 to prevent leakage of oil.

The bearings are lubricated by suitable oil ducts such as 73 which communicate with the interior of the driven shaft 60. The nut 69 is provided with oil ducts 73' therethrough and has a peripheral flange 69' adapted to act as an oil sling.

A pair of thrust bearings are provided, the one located adjacent the intake manifold member, and the other relatively large and heavy being located at the other end of the driven shaft, adapted to take the heavier thrust load from the pistons. The lighter bearing comprises a pair of oppositely disposed races 76 and 77 journaled upon the intermediate portion of the shaft with the race 76 resting against the face of the intake manifold member. The thrust is transmitted from the shaft through the bearing to the housing by a thrust ring 78 screwed upon a threaded portion of the shaft locked in position by a lock nut and washer 79 and 80.

The main thrust bearing is journaled upon the shaft adjacent the rear main bearing and comprises a pair of races 81 and 82 the race being adapted to engage the annular portion 83 of the end wall which houses the rear main bearing. Thrust is transmitted from the shaft to the housing by a thrust nut 84 screw-threaded upon the shaft and locked into position by a lock washer 86 and lock nut 87.

Lubricant is supplied to the hollow shaft by an oil pump through the conduit 6 formed in the housing and communicated from the conduit through a flexible tube 88 to an oil supply member or coupling 89 which is journaled upon a shaft.

Figures 14, 14A:
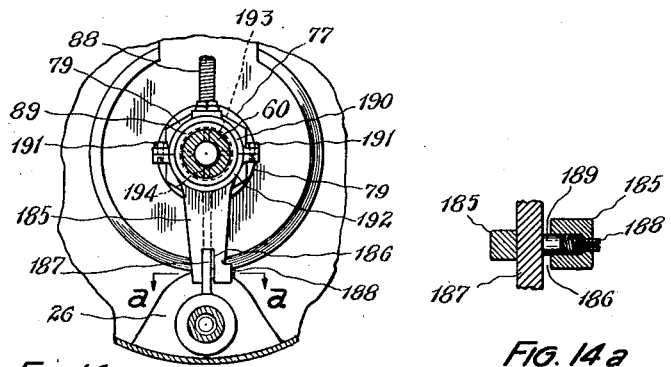
Fig. 14 is a fragmentary section taken from the line 14—14 of Fig. 4.
Fig. 14a is a fragmentary sectional view taken from the line a—a of Fig. 14.

The coupling comprises upper and lower caps 190 and 192 secured together by bolts 191 which are disposed about a groove 193 formed in the caps and registering with a series of oil holes 194 in the shaft. Rotation of the coupling is prevented by a downwardly depending arm 185 which is provided with a slot 186 in the end adapted to resiliently engage the web 187 disposed on the lower end housing, being held thereto by a set screw 188 and a spring pressed plunger 189, as better shown in Figures 14 and 14a.

The shaft is provided with a tapered hub 90 adapted to support a cam member 91 sometimes called a swash or wobble plate which comprises a hub portion 92 provided with a tapered bore 93 and having a suitable keyway 94 therein. A flange 95 extends from the hub, the periphery 96 of the flange forming a circle the plane of which is inclined to the axis of the shaft or hub. The member is adapted to be held upon the tapered portion 90 of the shaft and secured thereon by a nut 97 and locknut 98 screw-threaded on the shaft, a key being disposed in the keyways of the member and the shaft. An annular oil groove 99 surrounds the shaft, provide with oil ducts 100 leading to the interior of the shaft and registering with oil ducts 101 which lead through the flange 95 to supply oil to bearings.

Each edge of the flange is formed with a circumferential groove which acts as inner races for bearings and are adapted to support an annular drive member, the cam member acting as a driven member. The drive member comprises an annular drive ring 102 and has an inturned annular flange 103 at one end. The inner end wall formed by the flange and the adjacent interior wall of the ring provide a seat for an annular outer bearing race 104 which is adapted to cooperate with the balls 105 engaging the inner race formed by the circumferential groove. The other end of the interior of the ring 102 is threaded and an outer race 107 is screw-threaded therein to form the outer race for the balls 106 disposed on the opposite side of the flange 96 from the balls 105. The race 107 is locked against rotation by a set screw 108 and lock nut 109 Figures 4 and 26 which extend through the ring and contact with the outer race preventing rotation thereof.

As best illustrated in Figure 26 the annular ring is provided with a plurality of radially extending parallel ears 110, each of the pairs of ears being provided with axially aligned apertures 111 in which are journaled universal joint elements, hereinafter more fully described.

The other end is provided with a tachometer socket 85 to which a tachometer coupling may be attached in the usual manner.

Longitudinal adjustment of the driven shaft is provided for by the adjustable thrusts for the various bearings.

Pistons and piston rods

The pistons 49 are rigidly secured to the piston rods 34 and comprise a head with an annular skirt depending therefrom, the periphery is provided with a plurality of annular grooves adapted to receive piston rings therein, in the usual manner. A bored boss 113 depends from the head, being rigidly supported by webs 112, in axial alignment with the piston. The piston rod, which is generally cylindrical, has screw-threaded into the end thereof a member 114 which is provided with a flange 115 spaced from the end; the end of the member fits snugly within the bored boss 113 and is secured thereto by the flange 115 and cap screws 116. The deflector plate 48 which is carried upon the end of the piston is of concavo convex form with the concave side facing the intake port.

Each piston rod, Figs. 28 to 31 inclusive has a yoke 122, screw-threaded in the end thereof, which is provided with a pair of oppositely extending arms or ears 123 provided with axially aligned apertures 124. Bored bushings 126 are disposed in the apertures and support a hollow pin 125. The pin 125 extends through a trunnion block 127 which is provided with trunnions 128 and is secured therein by a bolt 129 which extends through the pin and trunnion.

Connecting link

The universal connecting link 118 comprises an intermediate web 130 and has a pair of yokes 131 at one end and 132 at the other end, the arms 131' and 132' of each of the yokes being provided with axially aligned apertures 133 in which bushings 134 are disposed to rotatably engage the trunnions 128. The one end of the joint element is connected to the yoke on the end of the piston rod, as described, and the other end is connected in a like manner to the radially extending ears 110 of the annular drive ring, the trunnion block being supported by the pin 125' in bushings 126' in the ears. It may thus be seen that the bolt 129 is accessible for removal through the openings in the housing.

*Accessories*

The train of gears, which have been previously described as being carried by a separate housing at the end of the main housing, are adapted to operate the magnetos, there being two magnetos shown, and are also adapted to operate the gasoline pump and the oil pump, as illustrated in Figures 32 to 39 inclusive.

The gasoline pump 135 is driven by a shaft 140 secured to the gear 11. The shaft extends into a pump housing 141 and drives the pump gears 142 and 143 therein.

A suitable packing gland or stuffing box is provided for the shaft, and inlet and outlet conduits 144 and 145 respectively conduct the gas from the gas tank to the pump and from the pump to the carburetor. The oil pump 137 is quite similar to the gasoline pump but comprises two separate pumping elements 146 and 147, driven by the shaft 138 secured to the gear 12. The element 146 is adapted to pump the oil from the oil supply reservoir not shown through conduit 144', and the element 147 is adapted to pump the oil from the sump 7 'through conduit 180. Oil that is pumped from the sump is strained through a screen in a suitable sediment strainer 148, and is returned to the reservoir. The element 146 delivers the oil to the oil passage 6 via the conduit 145'. The element 147 delivers the oil to the oil storage tank via conduit 181.

The gasoline pump and oil pump are each provided with a pressure relief valve for by-passing the excess gasoline or oil pumped. The description of one of these pressure relief valves, for instance that on the oil pump, Fig. 39, will suffice for both, as they are substantially the same.

The oil from the oil reservoir entering into the line 144' is forced by the gears into the outlet 145' which conducts it to the oil passageway 6 and when the pressure in the line 145' exceeds a predetermined amount, as it will if a sufficient supply is to be assured under all operating conditions, the excess pressure raises the ball 172 allowing the oil to escape through the overflow passage 173 whence it is returned to the oil reservoir. The ball valve 172 is disposed in the bottom of a vertical bore 174 in the upstanding boss 171 one end of which bore is restricted to provide a suitable seat 175 for the valve and is held in spring-pressed relation with the seat by means of a helical spring 176. The tension of the spring may be adjusted and thus the operating pressure is controlled by a threaded plug 177 which is screwed into the threaded opening of the bore, the bore being closed adjacent its upper end by a plug 178. The oil is pumped from the sump to the oil reservoir in a similar manner by the pump element 147 being drawn from the sediment strainer 148 through the conduit 180 to the inlet and from the outlet 181 to the oil reservoir.

In the case of the gasoline pump 135 the excess gasoline passes through the ball valve 172 and returns to the gasoline storage tank, not shown, through duct 136.

The gasoline pump pumps the gasoline from the storage tank into inlet 144 and out of outlet 145 by means of the gears 142 and 143, surplus gasoline is by-passed by means of the relief valve 172 into the overflow line 136 which returns the surplus gasoline to the tank.

*Torque arm and guide*

As illustrated in Figures 4, 26 and 27 the annular driving ring 102 is provided with an arm 150 which extends radially therefrom. A pivot member 151 is screw-threaded into the arm and pivotally supports a rectangular block 152 on its end, the block being held in place by a suitable nut 153 threaded on the reduced end of the pivot. The block is adapted to reciprocate in a guideway 154 which is supported by the housing. The guideway is relatively long and has reduced cylindrical ends 155 and 156 journaled in suitable bearings 157 and 158. It is provided with a longitudinal aperture 159 which extends vertically through the guideway and allows the block 152 to slide freely longitudinally therein, the one side wall of the guide is removable, being formed by a plate 160 secured to the main portion of the guideway by suitable screws 161. The guideway may be adjusted longitudinally by means of a threaded member 162 which is screw-threaded in a boss 163 supported by the housing 26 and locked against rotation by a set screw 26'. An aperture is provided in the manifold member through which a screw driver may be inserted to engage the end of the slot in the member 162 to screw-thread the same longitudinally thus adjusting the longitudinal play of the guide member, and may be closed normally by a plug 164.

*Operation*

The operation of this engine is substantially as follows:

Fuel is fed to the carburetor 24, disposed above the engine by the pump and is properly vaporized therein. On the compression stroke of the piston, the piston travels towards the head, and a so-called vacuum is set up in the primary compression chamber formed in the rear of the piston by the piston and the piston guide and the cylinder wall. When the piston reaches the position near the head of the cylinder, wherein the skirt has uncovered the intake port 44, the gaseous mixture flows from the intake manifold through the apertures 43 and 43′ canal 40 and ports 44 into the chamber in the rear of the piston, filling the chamber full of gaseous mixture.

The piston starting on the return or power stroke compresses the mixture in the rear of the piston until that point is reached wherein the head of the piston uncovers the intake port 46. The compressed gases then flow out through the apertures 45 through the canals 41 into the cylinder through the inlet port 46. The deflecting plate causes the gases to take a swirling motion wherein the gases pass up the side of the cylinder adjacent the port and around toward the exhaust port assisting the exhaust gases to escape through the exhaust port 37. The exhaust ports are sufficiently large so that they become uncovered before the intake port so that the exhaust gases have already started to leave the chamber above the piston before the intake gases start into the chamber.

The reciprocation of the piston on the compression stroke causes a compression of the gases which are fired when the piston reaches the proper point, forcing the piston forcibly downward.

The downward travel of the piston and piston rod is communicated to the drive ring through the universal connection previously described. The forces applied to the drive ring or thrust are communicated directly to the cam element through the medium of the ball bearings disposed in the races. Such forces are best illustrated in Figures 6 to 9 inclusive, by the arrows, the figures showing a fragment of the shaft and the cam element.

Figure 8 shows the element in the position substantially the same as that shown in Figure 5 and the thrust exerted by the connecting rod is indicated by the arrow $a'$. This same thrust may be indicated in Figure 6 by a similar arrow $a'$ and it is to be noted that the effect of the thrust is to have a camming action upon the edge of the cam element in such a manner that the cam is rotated in the direction shown. This action continues throughout the cycle until the end of the power stroke is reached wherein the thrust is then reversed being exerted from the cam element to the piston rod on the compression stroke. Any tendency of the drive ring 102 to rotate is restrained by the torque member 152 which is disposed in the guide 154 but which permits the drive ring to oscillate longitudinally relieving lateral stresses that otherwise might be set up in the piston rods and connecting joints.

It is to be particularly noted that upon the power stroke, or the beginning of the power stroke, the various elements interconnecting the drive ring, and piston rod are in substantial alignment, thus eliminating lateral thrust thereupon.

The oil supply passage 6 has also connected thereto a plurality of short pipes 204 which may be bent so that the oil may be deposited upon the various parts of the working mechanism.

Having thus described my invention I am aware that numerous and extensive departures may be made therefrom, but without departing from the spirit of my invention.

I claim:

1. In an engine, a housing, a shaft rotatably supported by said housing, a manifold supported by said housing, cylinders supported by said manifold the axis of said cylinders being disposed in oblique relation to the axis of said shaft, pistons disposed in said cylinders and means including rods connecting said pistons to said shaft.

2. In an engine, a housing, a shaft rotatably supported by said housing, a manifold supported by said housing, cylinders supported by said manifold, the axis of said cylinders being disposed in oblique relation to the axis of said shaft, pistons disposed in said cylinders and means operatively connecting said pistons to said shaft including piston rods and a circular flange carried by said shaft with the plane of the edge of said flange oblique to the axis of the shaft.

3. In an engine, a housing, a manifold supported thereby, cylinders supported by the manifold, a driven shaft rotatably carried by the housing, pistons reciprocable in said cylinders piston rods for said piston, driven means carried by said shaft including a cam disposed obliquely to the axis of the shaft and an annulus rotatably supported by the cam, swivelable means connecting said rods to said annulus, said shaft being adjustable longitudinally relative to the cylinders adapted to vary the volume of the compression chamber above said cylinder, said cylinders being disposed with their axes oblique to the axis of said shaft.

4. In an internal combustion engine, a housing and a manifold member, a rotatable shaft supported by the housing and said manifold member and extending beyond the confines thereof, means to support the shaft adjacent the end including a tubular member surrounding the shaft and a plurality of adjustable rods connected to the tubular member and the manifold member, cylinders carried by the manifold member, pistons and rods disposed in the cylinders and means to operatively connect said piston rods to said shaft.

5. In an internal combustion engine, a substantially cylindrical housing, a manifold member supported on one end and an accessory casing disposed on the other end, cylinders and piston rod guides supported by the manifold member, a rotatable shaft supported by said housing and manifold member, said shaft extending beyond the confines of said housing, a tubular support for said shaft supported by the housing and means for bracing said support comprising a plurality of radially extending rods connected to the end of said tubular member and adjacent the periphery of said housing, pistons and piston rods rigidly secured thereto reciprocable in said cylinders and means operatively connecting said piston rods to said shaft.

6. In an internal combustion engine, a substantially cylindrical casing, a manifold member supported at one end thereof an accessory supporting member disposed at the other end, a shaft rotatably supported by said manifold member and casing and extending beyond the confines thereof, cylinders disposed upon the manifold member with their axes in a conical plane about said shaft, pistons operable in said cylinders, piston rods rigidly connected to said pistons, means to operatively connect said pistons to said shaft including a wobble plate carried by the shaft an annulus relatively rotatably disposed on said wobble plate and connecting links connecting said annulus to said piston rods, means carried by the piston rod and means supported by the housing to prevent lateral movement of said annulus including a torque arm rigidly carried by the annulus a swivelable block disposed on said arm, and a guideway carried by the casing, said block adapted to move within the confines of said guideway.

7. In an internal combustion engine including a housing and a rotatable shaft supported thereby and extending beyond the confines of the housing, supporting means for the end of the shaft including a member surrounding the shaft and a plurality of supports connecting said member to the housing.

8. In an internal combustion engine including a housing and a rotatable shaft supported thereby a manifold surrounding the shaft and supported by the housing, means to support the end of the shaft including a tubular member secured to the manifold.

9. In an engine, a housing, a shaft rotatably supported by the housing, cylinders immovably disposed on the housing with the axes thereof in oblique relation to the axis of said shaft, pistons disposed in said cylinders, and means including rods and a wobble plate connecting said pistons to said shaft.

10. In an engine, a housing, a shaft rotatably supported by the housing, cylinders immovably disposed on the housing with the axes thereof in oblique relation to the axis of said shaft, pistons disposed in said cylinders, and means including rods and a wobble plate connecting said pistons to said shaft.

11. In an engine, a housing, a shaft rotatably supported by said housing, cylinders immovably disposed on the housing with the axes of said cylinders disposed in oblique relation to the axis of said shaft, pistons disposed in said cylinders and means operatively connecting said pistons to said shaft including piston rods and a circular flange carried by said shaft with the plane of the edge of said flange oblique to the axis of the shaft.

12. In an internal combustion engine, a housing, a manifold disposed in one end of said housing, an accessory casing disposed on the other end of said housing, cylinders and piston rod guides supported on the manifold end of said housing, a rotatable shaft supported by said housing and extending beyond the confines thereof, a support for the shaft carried by the housing, bracing means for the support including rods extending between the end of said support and the housing, pistons with piston rods rigidly secured thereto reciprocable in said cylinders, and means operatively connecting the rods to the shaft.

13. In an internal combustion engine, a housing, cylinders obliquely supported thereby, a rotatable shaft carried by the housing, pistons in the cylinders, piston rods connected to the pistons, a wobble plate carried by the shaft, a stroke ring relatively rotatable supported on the wobble plate, universal joints connecting said piston rods to the stroke ring, a radial thrust bearing interposed between the stroke ring and the wobble plate, a longitudinal thrust bearing interposed between the shaft and the housing end wall adapted to absorb longitudinal thrust imparted to the drive shaft by the stroke ring from the pistons through the wobble plate.

In testimony whereof I hereunto affix my signature this 30th day of April, 1929.

CHARLES E. SCHLENKER.